US008799649B2

(12) United States Patent
Eyal et al.

(10) Patent No.: US 8,799,649 B2
(45) Date of Patent: Aug. 5, 2014

(54) ONE TIME PASSWORDS WITH IPSEC AND IKE VERSION 1 AUTHENTICATION (75) Inventors: Anat Eyal, Tel Aviv (IL); Ben Bernstein, Tel-Aviv (IL); Anat Bar-Anan, Tel Aviv (IL); Nimrod Vered, Moshav Mishmeret (IL)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 12/779,457

(22) Filed: May 13, 2010

(65) Prior Publication Data
US 2011/0283103 A1 Nov. 17, 2011

(51) Int. Cl.
*H04L 29/06* (2006.01)
*H04L 9/32* (2006.01)

(52) U.S. Cl.
USPC ............. 713/156; 713/153; 713/168; 726/10; 370/235

(58) Field of Classification Search
USPC .......... 713/156, 155, 168; 726/5, 10; 370/235
See application file for complete search history.

(56) References Cited

U.S. PATENT DOCUMENTS

| | | | |
|---|---|---|---|
| 6,931,529 B2 * | 8/2005 | Kunzinger | 713/153 |
| 7,113,996 B2 | 9/2006 | Kronenberg | |
| 7,421,732 B2 | 9/2008 | Costa-Requena | |
| 2002/0091921 A1 * | 7/2002 | Kunzinger | 713/153 |
| 2002/0093915 A1 * | 7/2002 | Larson | 370/235 |
| 2002/0138728 A1 | 9/2002 | Parfenov | |
| 2007/0005955 A1 * | 1/2007 | Pyle et al. | 713/156 |
| 2007/0067828 A1 * | 3/2007 | Bychkov | 726/3 |
| 2008/0034216 A1 * | 2/2008 | Law | 713/183 |
| 2008/0137863 A1 | 6/2008 | Thomas | |
| 2008/0183851 A1 | 7/2008 | Puthupparambil | |
| 2009/0025080 A1 | 1/2009 | Lund | |
| 2009/0158033 A1 * | 6/2009 | Jeong et al. | 713/156 |

OTHER PUBLICATIONS

Configuring SonicWALL SSL VPN 3.0 One Time Passwords—Published Date: Apr. 19, 2006 http://www.sonicwall.com/downloads/SSL_VPN_3.0_One_Time_Password_Feature_Module.pdf.
RFC2289—A One-Time Password System- Published Date: 1998 http://www.fans.org/rfcs/rfc2289.html.
Implementation of Certificate Based Authentication in IKEv2 Protocol—Retrieved Date: Mar. 15, 2010 http://www.zemris.fer.hr/~sgros/stuff/iti/article.pdf.

* cited by examiner

*Primary Examiner* — Brandon Hoffman
*Assistant Examiner* — Samuel Ambaye
(74) *Attorney, Agent, or Firm* — Ben Tabor; Kate Drakos; Micky Minhas (57) ABSTRACT

A system adapted to condition access to a network over an IPsec session to clients providing a proper one-time-password, even though the network access control uses IKEv1, which does not support one-time-passwords. An authentication service receives from a client an access request including the one-time-password, and provides the one-time-password to a service that checks the password. The one-time-password service returns a cookie when the password is successfully validated and the client is properly authenticated. The cookie is passed on to the client computer, which uses the cookie as part of a request for a certificate. A certificate authority generates a certificate if a request for a certificate is received from an authenticated client, which in turn may be used to form the IPsec session for access to the network.

20 Claims, 3 Drawing Sheets

ONE TIME PASSWORDS WITH IPSEC AND IKE VERSION 1 AUTHENTICATION

BACKGROUND

For most private networks, some form of authentication is required before a client computer is allowed to access resources on the network. A client computer may be authenticated when the computer, or the user of the computer, provides authentication information, which may be based on one or more "factors." A factor may be something possessed by the user, such as a smart card, or something known to the user, such as a password, or some attribute of the user, such as a fingerprint or eyelid reading. The number and nature of these factors required for authentication may depend on the risk of improperly granting access or likelihood that a client computer is not authorized to access the network.

Authentication information may be based directly on one or more of these factors. In other instances, authentication information may be derived indirectly from one or more of these factors. A client computer may provide one or more of these factors to a source trusted by a network administrator, which may then issue a certificate, identifying a device as a valid client. The certificate, whether alone or with other factors, may authenticate the client computer. Regardless of how the information is obtained, it may be used as part of an exchange between the client computer and an access control mechanism such that the access control mechanism only grants access if the client can be authenticated.

Various mechanisms may be employed to enforce a determination of whether to grant or deny access to a client. Typically, following an authentication process, an authorization process is performed using the authentication information together with additional parameters to determine the access rights of the specific client. The specific mechanism by which access is limited based on access rights of a client may depend on the implementation of the transport layer of the network. In general, once a client is authenticated, the transport layer will route messages to or from the client that are consistent with the access rights of that client. For devices that are not authenticated, even if physically connected to the network, the transport layer does not pass messages to or from the device.

One mechanism to enforce an access determination involves the use of a protocol called IPsec. If a client is not authenticated, the network transport layer will not form an IPsec session for the client to send and receive network communications.

One type of authentication, which is regarded as providing strong security, is a one-time-password. There are multiple technologies that enable generation of one-time-passwords, such as an electronic device tied to a clock that generates a new password at periodic intervals or a pre-printed list of passwords. Regardless of the form in which the passwords are generated, they enhance security because the passwords can be used to gain access to the network for only a limited period of time, which may be defined by a relatively short time interval or by use of the password. Therefore, even if a malicious third party gains access to the password, that third party is unlikely to be able to use the password to access the network.

Unfortunately, though IPsec is widely used for access control, many implementations do not support one-time-passwords. Forming an IPsec session may entail using an Internet Key Exchange (IKE) protocol. The widely used version 1 of the Internet Key Exchange protocol (IKEv1) does not support one-time-passwords. Though version 2 of the Internet Key Exchange protocol (IKEv2) supports one-time-passwords, IKEv2 is not widely used, particularly for remote access control for corporate networks.

SUMMARY

The inventors have recognized and appreciated that improvements in network security may be made by adapting a network access control system, which does not inherently support one-time-passwords, to restrict access to the network to only those clients presenting a valid one-time-password. The access system includes an authentication service that, upon receiving an authentication request from the client containing a one-time-password, submits the password to a one-time-password service. The one-time-password service checks the validity of the password and, if validated, returns an indicator that the one-time-password was validated. This indicator may be returned to the client, which may then submit the indication in connection with a request for a certificate. A certificate authority will issue a valid certificate upon receipt of the indicator. The client may then use the certificate to form a connection.

Because the certificate authority selectively issues a certificate based on the client submitting the indicator that the one-time-password was validated, access is limited to clients having a valid one-time-password. In this way, an access control mechanism that relies on a valid certificate allows access to those clients with valid-one-time passwords and denies access to clients without valid one-time-passwords, even if the access control mechanism does not, itself, use a protocol that supports one-time-password authentication. As a specific example, the access control mechanism may use an IPsec security association formed using IKEv1 to enforce access control decisions.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A network that uses access control that does not support one-time-passwords may be adapted to use such passwords. The adaptation may be implemented by providing one or more services that can validate a one-time-password and issue an indication that the one-time-password for a client has been authenticated. A certificate authority may condition grant of a certificate used to gain network access on a client requesting such a certificate to have received an indication that its one-time-password was validated.

In some embodiments, this technique may be used in a corporate network to grant or deny access to clients based on whether the client has a valid one-time-password. In this way, a corporate network with a remote access control system that does not support one-time-password authentication may be adapted to implement an access control policy based on one-time-passwords. In some embodiments, the technique may be used with legacy network access control systems. As an example, a system that enforces access control through an IPsec security association using IKEv1 may be adapted to require a valid one-time-password for network access.

The techniques described herein may be employed in any suitable network environment. An exemplary embodiment of a network environment in which embodiments of the invention may be practiced is illustrated in FIG. 1.

Figure 1:
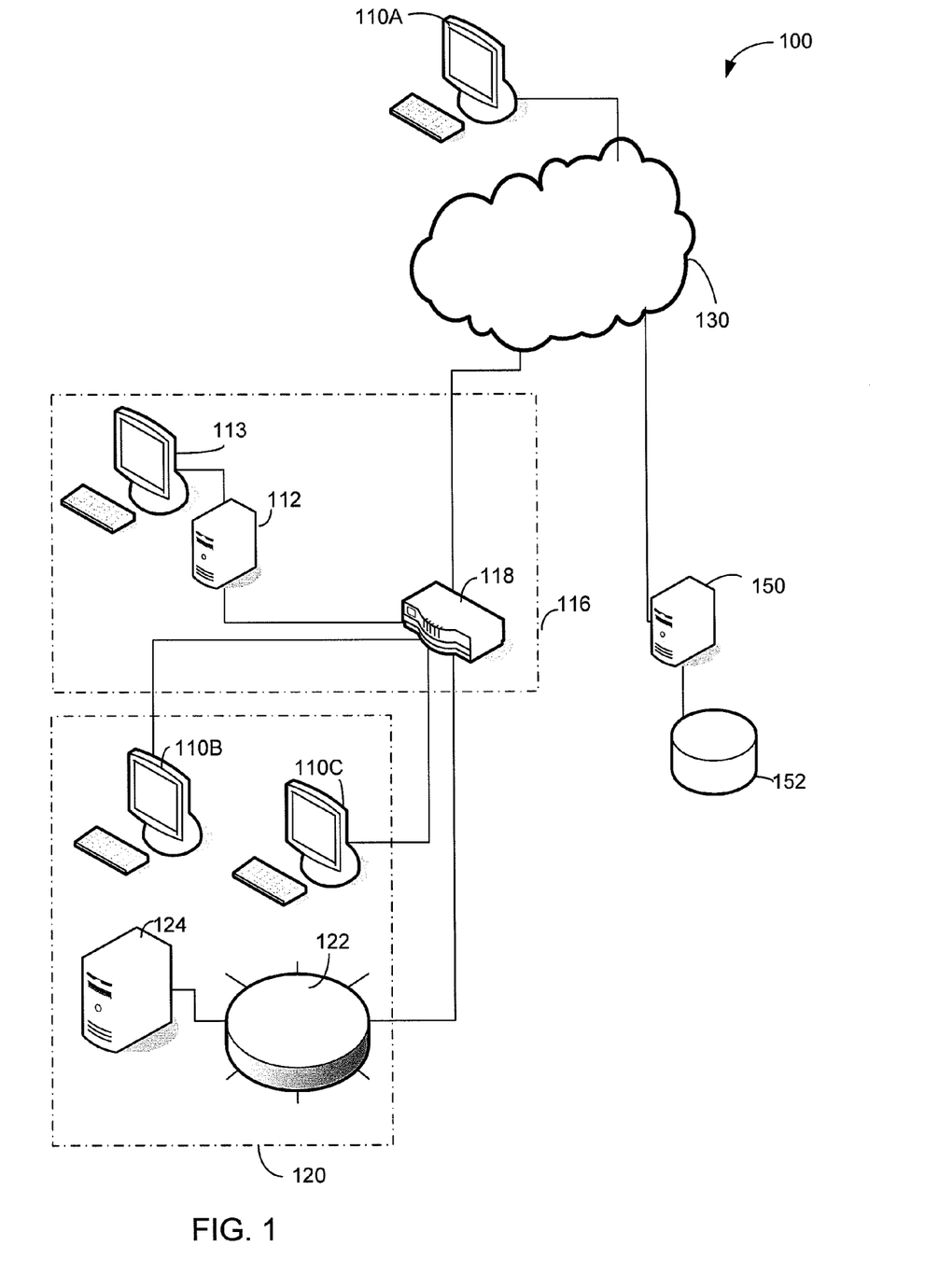
FIG. 1 is a sketch of an exemplary network environment in which client devices may be authenticated according to some embodiments of the invention.

FIG. 1 shows a sketch of a computer system 100, which may be constructed from devices as are used in conventional computer systems. However, computer system 100 differs from a conventional computer system in that devices within computer system 100 are programmed to require a one-time-password to gain access to a network.

Computer system 100 includes a private network, here illustrated as managed network 120, with multiple resources, such as server 124, connected to the network. Client devices may connect to the network and access the network resources. Though the network is private because access to the network may be limited to only authorized client devices.

In this example, managed network 120 may be a network within a company or enterprise. Alternatively, managed network 120 may be a domain or other portion of a larger network. Managed network 120 may be managed by an individual or entity that provides access criteria for the network. In the exemplary system described herein, the access criteria include a one-time-password and other information from which an authorized client device may be identified.

As to the information from which an authorized client device may be identified, any suitable information may be used. In some embodiments, the device may be authenticated because a user of the device is authorized to access the network and has input into the client information that serves as proof of that authorization. In those embodiments the authentication information may relate to a user of a device, and may be a user name or other code. In other embodiments, the information may relate to only one of multiple users associated with multiple user sessions on a computer. For example, if a computer supports multiple user sessions, only a subset of the user sessions may be authorized to access the network. In those embodiments, the authentication information may relate to a specific user session or sessions. Accordingly, the invention is not limited by the type of entity for which authentication is provided.

As shown in FIG. 1, managed network 120 includes network devices such as server 124 and clients 110B and 110C. Here a wide area network (WAN) 122 is shown interconnecting the network devices. This configuration is shown for simplicity of illustration, but the network for which access is controlled may contain multiple interconnected networks or contain different or additional interconnection architectures. Likewise for simplicity, a small number of network devices are illustrated, but a managed network may contain numerous devices.

Devices may connect to managed network 120 through a gateway that provides access control. For simplicity, a single access control gateway 116 is shown. Access control gateway 116 may be part of a wireless access point, hard wired access point or any other type of access point, whether now known or hereafter developed. Though, in the example illustrated, access control gateway 116 is connected to a public network 130, such as the Internet. Such a connection to a public network may allow client devices in remote locations to access managed network 120, provided the remote clients can comply with access control policies enforced by access control gateway 116.

In the example of FIG. 1, access control gateway 116 includes a switching device 118 and access control server 112. Access control server 112 may be configured through user interface 113 or in any other suitable way. Switching device 118 represents any of a number of types of switching devices that may be included in a network. Here switching device 118 illustrates a component of the transport layer of the network. Switching device 118 may be a device such as a router, switch, hub, gateway, or any other suitable switching device. In a commercial implementation, there may be multiple switching devices involved in the routing packets as appropriate through a network, but only one such device is shown for simplicity.

The example of FIG. 1 shows that client 110B and 110C have already been given access to managed network 120. Conversely, FIG. 1 shows client 110A seeking to connect to managed network 120 through access control gateway 116, and is thus illustrated outside the managed network 120. In operation, as a client such as client 110A seeks access to managed network 120, an access control device determines whether client 110A should be given access to managed network 120. In the embodiment illustrated, that access control device is implemented in access control server 112. Though, it should be appreciated that other embodiments are possible, including embodiments in which a network device being accessed serves as the access control device. In an embodiment in which an access decision is made in access control server 112, access control server 112 may be programmed to determine whether to grant or deny network access based at least in part on whether a client supplies an appropriate one-time-password.

Additionally, access control server 112 may be configured to condition access on other factors. For example, access control gateway 112 may authenticate clients and verify that clients report a hardware or software configuration complying with a "health" policy for the network. Regardless of the number and type of aspects of a client authenticated, access control server 112 does not indicate that a client should be granted network access unless all required aspects are validated.

Access control server 112 communicates a determination of network access to an enforcement mechanism. The enforcement mechanism may be contained within the transport layer of network 120, which is represented by switching device 118, but may contain numerous different or additional devices. In the embodiments illustrated, the determination that a client is to be granted network access may be enforced by requiring remote client, such as client 110A, seeking access to managed network 120 to form a security association.

Security associations are known in the art and may be employed by one networked device joined by a security association to determine that a network communication originated from another device that is part of the security association. Security associations may also be used to allow a networked device to ensure that communications from another device that is part of the security association were not altered after they were transmitted. Additionally, a security association may be used to encrypt communications between devices that are linked through the security association. These uses of a security association are sometimes referred to as authenticity, integrity and confidentiality.

In the embodiments described herein, an access control gateway may use a security association to provide authenticity, integrity and confidentiality. Messages passing through the gateway to an authorized device may be encrypted by the gateway such that they may only be decoded by an authorized client that is part of a security association if the messages have not been altered. Similarly, messages received at the gateway may be forwarded onto managed network 120 only if they can be decrypted and authenticated. Though, in other embodiments, the security association may be used only to ensure authenticity, and the gateway may pass messages if they have been authenticated.

Regardless of the specific way in which the security association is used in the gateway, the security association may be formed by exchanging messages in a protocol that results in a device and the gateway sharing secret information. This secret information may be subsequently applied by the client or the gateway when sending information to the other to sign or encrypt that information using known cryptographic functions. The recipient, also having access to the secret information that is part of the security association, can decrypt the information and/or validate that the information was signed by another device sharing the security association.

In the example of FIG. 1, access control server 112 may interact with a client 110A seeking network access over network 130. As a result of these interactions, access control server 112 and remote client 110A may form a security association. Switching device 118 may be configured such that communications from client 110A are not directly allowed onto managed network 120. Rather, those communications may be first processed in access control server 112. If access control server 112 determines that the communications were sent using an established security association, those communications may be routed onto managed network 120. If the communications are encrypted, access control server 112 may use the security association to decrypt the communications, allowing other network devices, such as network server 124, to access communications from client device 110A.

Conversely, for communications sent from devices on network 120, switching device 118 will only allow such communications to pass onto network 130 if they have been encoded according to a security association formed by access control server 112 with an authenticated client. Because the network communications are encrypted according to the security association, other devices, even those that can access the communications over public network 130, can not derive their content. In this way, messages can be sent to or received from devices on managed network 120 by remote clients, such as client 110A, only if those remote clients that can form valid security associations with access control server 112.

Therefore, security associations are formed in a way that allows only authorized clients to form them. Prior to forming a security association, access control server 112 may receive authentication information about a client, such as client 110A. The authentication information may be obtained in any suitable way. The authentication information may be based in whole or in part on information input into client device 110A through a user interface of that device. Alternatively or additionally, the authentication information may be based in whole or in part on interactions between the client and an external device. In these scenarios, the authentication information may be evidence of a successful authentication performed by the external device. Such evidence may be in the form of a certificate, which access control server 112 may use to determine whether to grant access. Certificates for demonstrating proof of authentication with an external device are known in the art, and access control server 112 may accept a certificate in a known format, though information in any suitable format that demonstrates authentication with an external device may be used.

In the embodiment illustrated in FIG. 1, authentication server 150 is an example of an external device. Authentication server 150 may authenticate a device in any suitable way. As illustrated, authentication server 150 may maintain a data store 152 of information about authorized devices that may be used to identify whether a device is authorized. For example, data store 152 may contain a list of authorized devices and security information, such as information that authentication server may use to determine whether a device provided a valid password. Though, any other suitable approach may be used and data store 152 may contain different or additional types of information, including pre-stored keys for authorized devices or other security information used in authenticating authorized devices.

In the embodiment illustrated, client 110A is shown to access authentication server 150 over a public network 130, such as the Internet. In this embodiment, communications between client 110A and authentication server 150 may be encrypted or otherwise secured using public key/private key encryption. Though, any suitable mechanism may be used for communication between client 110A and authentication server 150.

Also, in the embodiment illustrated, authentication server 150 is shown outside network 120. Other embodiments are possible, including having authentication server 150 on network 120. In such an embodiment, switching device 118 may provide limited connectivity to authentication server to unauthenticated devices.

Regardless of the location of authentication server 150, a mechanism for communication between authentication server 150 and access control server 112 may be provided. In the embodiment illustrated, that mechanism may be through a certificate. Authentication server 150 may issue a certificate to client 110A upon successful authentication of that client. The certificate may be signed using security information held by authentication server 150 that access control server 112 can validate. As an example, a certificate may be signed or encrypted with a private key of a public key/private key pair. If access control server 112 has the public key of this key pair, access control server 112 may validate that the certificate was issued by authentication server 150. The certificate may contain information identifying client 110A that is signed by authentication server 150 to ensure integrity of the information such that access control server 112 can determine that the certificate was issued to client 110A. Accordingly, access control server 112 may rely on the certificate to determine that client 110a is authenticated for the purposes of forming a security association with client 110A.

Components of the computer system of FIG. 1 may be implemented using network components of the type that are known in the art. However, authentication server 150 may be adapted to only issue a certificate to devices that present a valid one-time-password. In this way, even though access control gateway 116 does not recognize one-time-passwords, access to managed network 120 is nonetheless restricted to clients having valid one-time-passwords. Accordingly, access control techniques as in system 100 may be employed with existing networks for which access control gateways have been implemented without the capability to require a one-time-password.

The inventors have recognized and appreciated that there are many such networks. In particular, many networks enforce access decisions by requiring that a client seeking access to the network form a security association with an access control component using the IPsec protocol with an internet key exchange protocol, version 1 IKEv1). Access control gateways using IPsec with IKEv1 are prevalent in corporate networks. Accordingly, addition of an authentication server 150 or modification of an existing authentication server in such a network may adapt the network to implement an access control policy requiring one-time-passwords.

Figure 2:
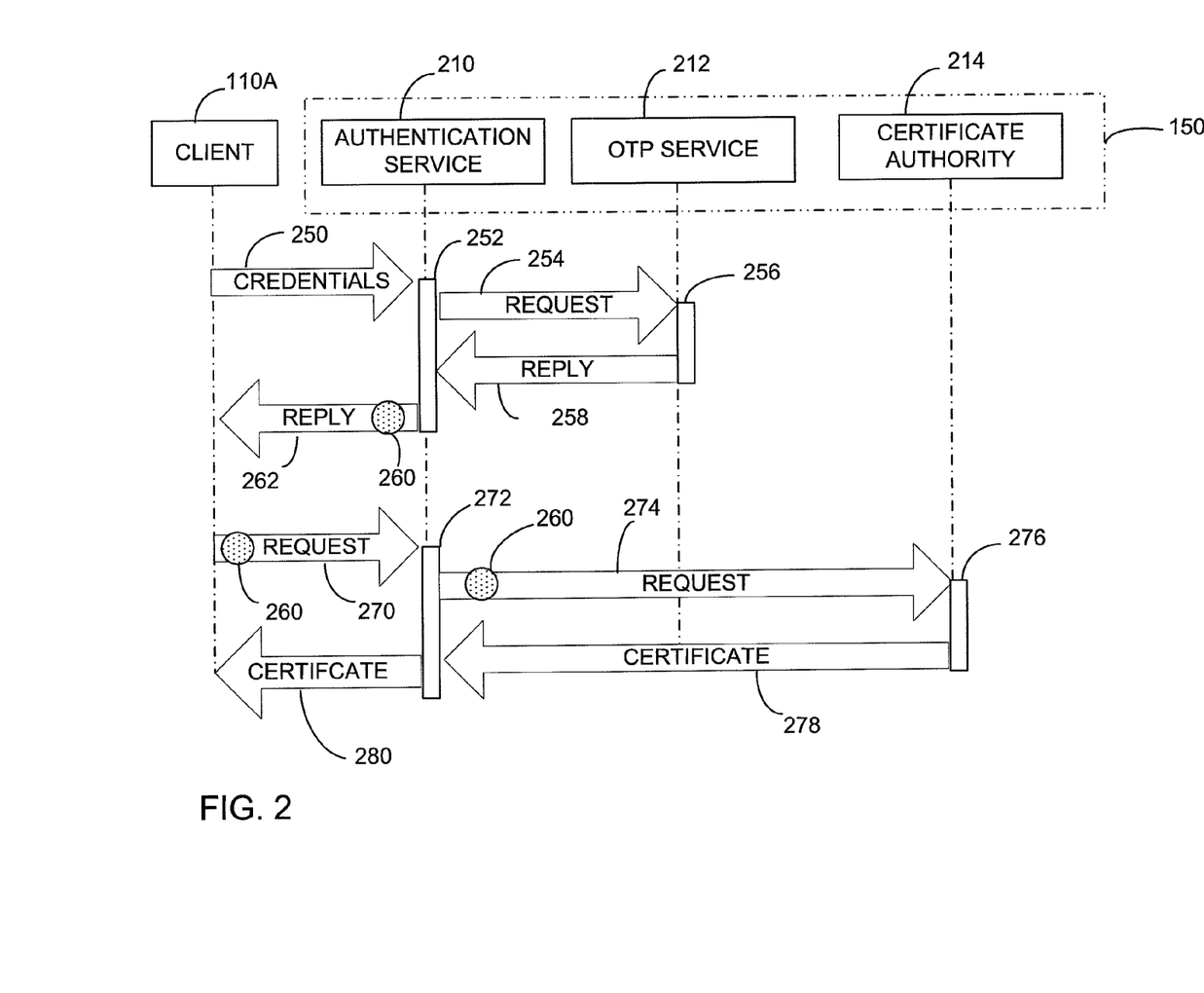
FIG. 2 is a schematic illustration of a process of obtaining a certificate based on a one-time-password according to some embodiments of the invention.

Turning to FIG. 2 a process by which a client, such as client 110A, seeking access to a network may obtain a certificate is illustrated. As shown in FIG. 2, client 110A may communicate with authentication server 150. Communications between client 110A and authentication server 150 may be transported in any suitable way. In the example of FIG. 1, these communications are transported over public network 130, such as the internet. Though, use of the internet is not a limitation on the invention.

In the embodiment illustrated, authentication server 150 provides multiple services. Those services include authentication service 210, one-time-password service 212 and a certificate authority 214. Such services may be implemented using programming techniques as are known in the art to adapt a computerized device to interact with other devices over a network and provide certain functionality as a service. Protocols for such communication are known, and may be used for communications between client 110A and authentication service 210, one-time-password service 212 and certificate authority 214. Though, any suitable techniques may be used to implement the services in any suitable format may be used.

Regardless of the specific format of the communications, the process of client 110A obtaining a certificate from authentication server 150 may begin with client 110A sending communication 250 to authentication service 210. Communication 250 may be sent, for example, as one or more packets conveyed over public network 130. Regardless of the specific format of communication 250, communication 250 may convey from client 110A to authentication service 210 credentials for client 110A. The credentials contained within communication 250 may include any number of credentials of a type as is known in the art. These credentials may include, for example, information about a user of client device 110A or about the client device itself. User information, for example, may include a user name and password or some information generated based on input of the user name and password.

In addition to credentials are known in the art, communication 250 may include a one-time-password. The one-time-password within communication 250 may be generated by a hardware component attached to client 110A. Though, such a one-time-password may be entered by a user or otherwise made available to client 110A.

Though FIG. 2 illustrates communication 250 by a single arrow, it should be appreciated that communication 250 may contain multiple transmissions from client 110 to authentication server 150. Additionally, one or more of these transmissions may be sent is response to communications from authentication service 210. As a specific example, authentication service 210 may transmit a challenge message to which client 110A must generate an appropriate response as part of communication 250.

Also, though communication 250 is said to contain credentials, it should be recognized that, as the term contain is used herein in conjunction with credentials or other security information, it encompasses the possibility that communication 250 actually contains information from which it a recipient can verify that the sender had access to the credentials or other security information, which does not require sending the security information.

Regardless of the format of communication 250, authentication service 210 may process the received information as part of processing 252. Processing 252 may entail authentication service 210 validating that the credentials contained in communication 250 correspond with a client authorized for access to network 120. Such validation may be performed using techniques as are known in the art.

Additionally, processing 252 may entail selectively generating communication 254 to one-time-password service 212, depending on whether the credentials correspond to an authorized client. Authentication service 210 may form communication 254 based on a one-time-password received from client 110 contained in communication 250.

One-time-password service 212 may process communication 254 in process 256. In process 256, one-time-password service 212 may determine whether communication 254 contains a valid one-time-password.

Any suitable techniques may be used in processing 256 to validate a one-time-password, including techniques as are known in the art for validating one-time-passwords. Validation may include determining both that password corresponds to a valid password and that it is presented at a valid time. The password may be invalid, for example, because it has expired or has been previously used. Though, the specific technique used to validate the one-time-password is not critical to the invention.

As with communication 250, communication 254 is shown as a single arrow. However, it should be recognized that communication 254 may entail one or more messages passed between one-time-password service 212 and authentication service 210. Additionally, though not shown in FIG. 2 for simplicity, the information in communication 254 may be generated based on information issued by one-time-password service 212. As a specific example, one-time-password service 212 may issue a challenge that is provided by authentication service 210 to client 110A. The password information as sent by client 110A may include the challenge issued by one-time-password service 212 encoded with the password by client 110A. Accordingly, though communication 254 is said to contain the password, that password may be represented in an encoded format or in any other suitable way.

Regardless of the format in which one time password service 212 receives the one-time-password from client 110A, one-time-password service 212 may issue a communication 258 indicating the outcome of the attempt to validate the one-time-password. Communication 258 may indicate that the one-time-password was successfully validated or may indicate that the password was not successfully validated. Processing 252 on authentication service 210 may be conditional, based on the content of communication 258.

If communication 258 indicates successful authentication of the one-time-password, authentication service 210 may issue a cookie 260 that is transmitted to client 110A as part of communication 262. In this example, cookie 260 indicates both that authentication service 210 validated credentials of client 250 and that one-time-password service 212 validated the one-time-password supplied by client 110A. Though, it should be appreciated that authentication of client 110A and validation of the one-time-password may be indicated separately.

Authentication service 210 does not issue cookie 260 in communication 262 if either of those conditions is not met. More generally, authentication service 210 does not issue cookie 260 unless all requirements for network access have been met. In some embodiments, communication 262 may be omitted entirely if cookie 260 is not provided. Though, in other embodiments, communication 262 may be provided without cookie 260 if all requirements for access are not satisfied by client 110A.

Cookie 260 may be in any suitable form, including formats as are known in the art. For example, cookie 260 may contain information that is signed or encrypted by authentication service 210 in such a way that a recipient of cookie 260 may subsequently validate that cookie 260 was issued by authentication service specifically to client 110A.

Regardless of the format of cookie 260, communication 262, including cookie 260, allows client 110A to demonstrate to certificate authority 214 that it has successfully presented credentials that authentication service 210 and one-time-password service 212 have validated such that client 110A may be deemed to be entitled to network access. Accordingly, client 110A may incorporate cookie 260 into a communication 270. Communication 270, in this embodiment, is sent to authentication service 210. In processing 272, authentication service 210 forwards the request along with the cookie contained within communication 270 to certificate authority 214 in communication 274. Communication 274 may be formatted as an enrollment request to certificate authority 214 using a protocol as is known in the art.

In processing 276, certificate authority 214 may process enrollment request 274 using techniques as are known in the art. However, that processing may be contingent on the enrollment request containing cookie 260. If, in processing 276, certificate authority 214 determines both that cookie 260 was generated for client 110A and the original certificate request in communication 270 were initiated by client 110A, certificate authority 214 will issue a certificate to client 110A.

Processing 276 may use techniques as are known in the art for validating that the certificate request is generated by a specific client for which a certificate is requested. Known techniques may also be used for validating that cookie 260 was both issued to client 110A and forwarded by client 110A. That validation may be based on information contained within cookie 260 in combination with encoding of that information using secret information available to client 110A. The secret information available to client 110A, for example, may include a key for which certificate authority 214 holds a corresponding key. As a specific example, the secret information may be a private key of a public key/private key pair for which certificate authority 214 holds a public key. Though, any suitable mechanism may be employed for certificate authority 214 to validate cookie 260 and the source of the request for a certificate.

Regardless of how this validation is performed, if certificate authority 214 validates the information, certificate authority 214 will issue a certificate which is conveyed in communication 278. Authentication service 210 may forward the certificate to client 110A in communication 280. In this scenario, the certificate in communication 280 does not directly contain information issued by one time password service 212. However, client 110A does not receive a certificate from certificate authority 214 unless it has successfully presented a valid one-time password accepted by one-time password service 212. Accordingly, though the certificate issued by certificate authority 214 may be in a format as is conventionally used in forming security associations, the certificate may nonetheless be a mechanism to enforce a policy requiring a valid one-time password.

Figure 3:
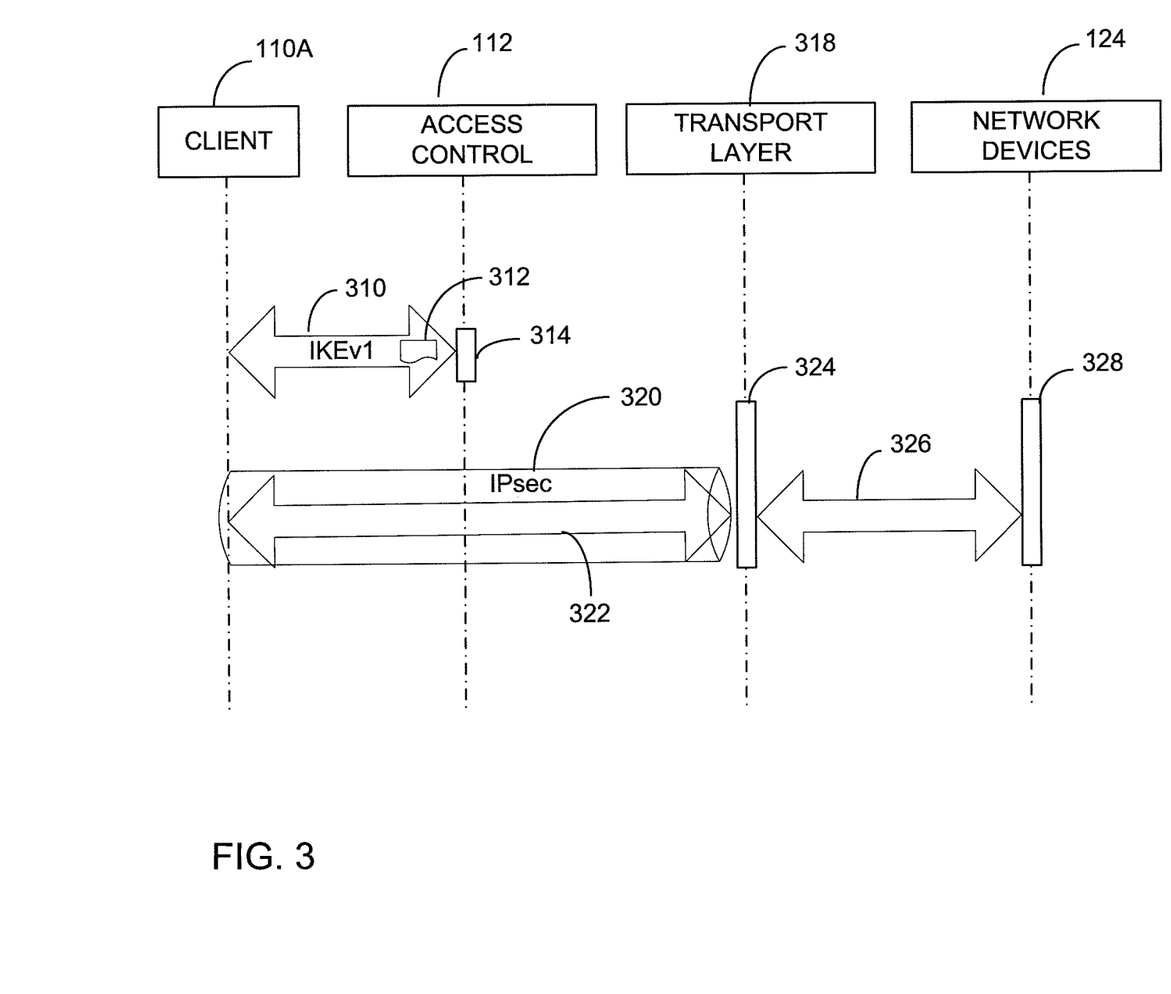
FIG. 3 is a schematic illustration of a process of gaining network access based on the certificate issued in the process of FIG. 2.

Turning to FIG. 3, a process by which client 110A may use this certificate to gain access to a network is illustrated. The process of FIG. 3 begins with client 110A initiating network interactions 310 with access control server 112 to form a security association. Network interactions 310 may entail communications as are known in the art between network devices for establishing a security association. In the embodiment illustrated, network interactions 310 result in the formation of an IPsec security association, provided that client 110A and access control server 112 properly authenticate to each other.

In the embodiment illustrated, network interactions 310 include a phase in which IKEv1 is used to establish shared secrets between client 110 and access control server 112. Additionally, network interactions 310 may include client 110A transmitting certificate 312 to access control server 112. Certificate 312 may be the certificate issued by certificate authority 214 (FIG. 2). As described above in connection with FIG. 2, certificate 312 is issued only upon client 110A demonstrating to certificate authority 214 that client 110A successfully presented a valid one-time-password to one-time password server 212. Accordingly, though access control server 112 does not expressly validate that client 110A presented a one-time-password, access control server 112 nonetheless does not form a security association with client 110A unless client 110A presented a valid one-time-password. Accordingly, though processing 314 performed by access control server 112 may be conventional processing as is known in the art to form a security association using IKEv1, a security association is nonetheless not formed unless client 110A presented a one-time-password, thereby restricting access to managed network 120 to only clients that can present a valid one-time-password, in addition to any other required credentials.

If client 110A presented a one-time-password, and therefore can present the valid certificate 312, processing 314 results in the formation of an IPsec security association 320. Based on the security association, an access enforcement component within the transport layer 318 of network 120 may allow communications between client 110A and network devices such as network device 124. The specific component within transport layer 318 is not critical to the invention, and any suitable component or combination of components may be used to enforce an access control decision. However, in some embodiments, the access control decision may be enforced by a switching device 118 or other similar component as in the example of FIG. 1.

Regardless of the specific component that enforces the access control determination, network interactions 322 sent by client 110A using the IPsec security association 320 may, based on processing 324 within the transport layer, pass on to the managed network 120 as network interactions 326 with the network devices 124. Network devices 124 may receive network interactions 326 and perform processing 328 on the inbound interactions and generate outbound network interactions 326. Such outbound network interactions 326 may pass through transport layer 318 as interactions 322 within the security association 320.

However, if an IPsec security association 320 is not formed, transport layer 318 does not pass communications from client 110A on to network 120 and such communications are not received by network devices 124. Conversely, network communications sent by devices 124, even if directed to client 110A, are not passed out of network 120 by transport layer 318. In this way, client 110A is blocked from communicating with network devices 124 unless it formed a valid security association 320, which in turn required a certificate, which client 110A obtained only upon presentation of a valid one-time-password.

Having thus described several aspects of at least one embodiment of this invention, it is to be appreciated that various alterations, modifications, and improvements will readily occur to those skilled in the art.

As one example, embodiments are described in which a client computing device gains access to a managed network to access a network resource such as a server 124. It should be appreciated that a "client" need not perform any specific function with respect to any network resource. A client may be regarded as any computing device that seeks to interact with a service to form an IPsec security association, regardless of the nature of that service or a specific configuration of a device on which it is implemented.

For example, FIG. 2 illustrates that authentication service 210, one-time-password service 212 and certificate authority 214 are contained within a single device, authentication server 150. There is no requirement that these components be contained in the same physical device and the functions of these components may be distributed over any number suitable devices.

Further, though access control server 112 and authentication server 150, there is no requirement that these components be implemented in separate devices.

As an example of yet another possible variation, FIG. 2 shows communications with one-time-password service 212 and certificate authority 214 p[assign through authentication service 210, this is not a requirement of the invention. Client 110A, for example may communicate directly with certificate authority 214.

Also, though it is described that authentication service sends request communication 256 after it authenticates client 110A, this order is not critical. Authentication service may, for example, attempt to authenticate client 110A after it receives reply communication 258.

Further, FIG. 3 illustrates an embodiment in which IPsec is used in an IPsec tunnel mode. In this embodiment, an IPsec tunnel is formed between the client 110A and the gateway 116, and then the gateway directs the traffic to an end resource, such as server 124) The IPsec tunnel is terminated on the gateway, from there the communication can be sent clear, or via IPsec.

In an alternative embodiment, IPsec may be used in an IPsec transport mode. In this embodiment, an end-to-end IPsec connection may be created between client 110A and an end resource, such as server 124. In this case the access control device may be part of the end resource rather than in a separate access control device, such as server 112.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Through, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device to establish an IPsec session, the method comprising:
    sending a first communication to an authentication service, the first communication containing a one-time-password;
    receiving, from a one-time password service, in response to the first commutation a reply comprising an indication that the one-time-password was successfully validated;
    sending a second communication to a certificate authority, the second communication containing the indication that the one-time-password was successfully validated by the one-time password service in response to the first communication;
    receiving, from the certificate authority, in response to the second communication a certificate, the certificate comprising the indication that the one-time-password successfully validated; and
    establishing the IPsec session with the certificate provided by the certificate authority.

2. The method of claim 1, wherein:
    establishing an IPsec session comprises establishing an IPsec session for remote access to a corporate network.

3. The method of claim 1, wherein:
    the indication that the one-time-password was successfully validated comprises a cookie in the reply.

4. The method of claim 1, wherein:
    sending the second communication comprises sending a parameter encrypted with a private key of the computing device.

5. The method of claim 1, further comprising:
    generating a value in the second communication with a private key of the computing device.

6. The method of claim 1, wherein:
    sending the first communication comprises sending the first communication addressed to an authentication service; and
    sending the second communication comprises sending the second communication addressed to the authentication service.

7. The method of claim 6, wherein:
    receiving the reply comprises receiving a message containing a cookie generated by a one-time-password service; and
    receiving the certificate comprises receiving a certificate generated by a certificate authority.

8. The method of claim 1, wherein:
    sending the first communication comprises sending the first communication addressed to an authentication gateway; and
    sending the second communication comprises sending the second communication addressed to the authentication gateway.

9. A system comprising:
    at least one processor coupled to a network, the at least one processor implementing:
    an authentication service
    a one-time-password service;
    a certificate authority;
    wherein:
        the authentication service is adapted to receive over the network a first communication from a client, the first communication containing credentials associated with the client and a one-time-password,
        the authentication service is adapted to validate the credentials associated with the client and convey the one-time-password to the one-time-password service;
        the one-time-password service is adapted to validate the one-time-password and return to the authentication service an indication of results of validation of the one-time-password;
        the certificate authority is adapted to receive over the network a second communication from the client, the second communication including the indication of results of validation of the one-time-password from the client and to selectively issue a certificate when the results received from the client indicate that the one-time-password was successfully validated by the one-time password service wherein the certificate includes an indication that the one-time password was successfully validated.

10. The system of claim 9, wherein the authentication service, the one-time-password service and the certificate authority comprise an authentication gateway.

11. The system of claim 9, wherein:
    the credentials associated with the client comprise credentials of a user of the client; and
    the authentication service is adapted to authenticate the credentials of the user.

12. The system of claim 9, wherein:
the system further comprises a corporate network, the corporate network comprising an access control gateway; and
the access control gateway is adapted to selectively form IPsec sessions granting access to the corporate network to client computers having certificates issued by the certificate authority.

13. The system of claim 12, wherein:
the corporate network does not support remote access control based on one-time-password authentication.

14. The system of claim 13, wherein the corporate network uses IKEv1 access control.

15. The system of claim 9, wherein:
the certificate authority is adapted to perform a public key encryption based authentication of the client; and
the certificate authority selectively issues the certificate when the client successfully authenticates using the public key encryption based authentication and the results indicate that the one-time-password was successfully validated.

16. At least one non-transitory computer-readable storage medium comprising computer-executable instructions that, when executed by a processor of a client computer, perform a method of forming an IPsec session, the method comprising:
sending a first communication to an authentication service, the first communication containing credentials of a user of the client computer and a one-time-password;
receiving from the authentication service in response to the first commutation a reply comprising an indication that the one-time-password was successfully validated;
sending a second communication to the authentication service, the second communication comprising a request for a certificate from a certificate authority and containing the indication that the one-time password was successfully validated in the first communication;
receiving from the authentication service in response to the second communication the certificate, the certificate comprising an indication that the one-time-password successfully validated; and
establishing the IPsec session with the certificate used in an Internet Key Exchange version 1 (IKEv1) protocol.

17. The at least one non-transitory computer-readable storage medium of claim 16, wherein the method further comprises formulating at least a portion of the second communication based on an a private key of a private key/public key pair of which the public key is shared with the certification authority.

18. The at least one non-transitory computer-readable storage medium of claim 16, wherein:
the indication that the one-time-password was successfully validated comprises receiving a cookie generated by a one-time-password service; and
sending the second communication comprises sending the cookie as part of the second communication.

19. The at least one non-transitory computer-readable storage medium of claim 18, wherein:
establishing the IPsec session comprises performing two-factor authentication, with the certificate providing one authentication factor.

20. The at least one non-transitory computer-readable storage medium of claim 16, wherein the method for comprises remotely accessing a corporate network using the IPsec session.

* * * * *